(12) United States Patent
Mittra et al.

(10) Patent No.: US 10,750,077 B1
(45) Date of Patent: Aug. 18, 2020

(54) CAMERA SYSTEM WITH MULTIPLE CAMERA

(71) Applicant: Himax Imaging Limited, Tainan (TW)

(72) Inventors: Amit Mittra, Tainan (TW); Tony Chiang, Tainan (TW)

(73) Assignee: Himax Imaging Limited, Tainan (TW)

( * ) Notice: Subject to any disclaimer, the term of this patent is extended or adjusted under 35 U.S.C. 154(b) by 0 days.

(21) Appl. No.: 16/280,061

(22) Filed: Feb. 20, 2019

(51) Int. Cl.
*H04N 5/232* (2006.01)
*H04N 7/18* (2006.01)
*H04N 5/247* (2006.01)

(52) U.S. Cl.
CPC ... *H04N 5/23206* (2013.01); *H04N 5/232411* (2018.08); *H04N 5/247* (2013.01); *H04N 7/181* (2013.01)

(58) Field of Classification Search
CPC .... H04N 5/23206; H04N 7/181; H04N 5/247; H04N 5/232411
See application file for complete search history.

(56) References Cited

U.S. PATENT DOCUMENTS 10,063,839 B2   8/2018  Muukki
2017/0078647 A1* 3/2017  Van Hoff ............. H04N 13/271

FOREIGN PATENT DOCUMENTS

TW    201138434 A   11/2011
TW    201537951 A   10/2015
TW    201604838 A    2/2016
WO    2018030238 A2  2/2018

* cited by examiner

*Primary Examiner* — Twyler L Haskins
*Assistant Examiner* — Angel L Garces-Rivera
(74) *Attorney, Agent, or Firm* — CKC & Partners Co., LLC

(57) ABSTRACT

A camera system is provided and includes a processor, a first camera, a second camera, and a data bus. The processor transmits a first trigger signal to the first camera to enable the first camera outputting first data to the processor through the data bus. The first camera transmits a second trigger signal to the second camera to enable the second camera outputting second data to the processor through the data bus.

8 Claims, 3 Drawing Sheets

CAMERA SYSTEM WITH MULTIPLE CAMERA

BACKGROUND

Field of Invention

The present invention relates to a camera system. More particularly, the present invention relates to the camera system with more than one camera.

Description of Related Art

In recent years, more than one camera can be integrated into an electrical device such as a smart phone, notebook, surveillance, drones, and other forms of embedded devices. Multiple cameras can consist of similar or dissimilar camera and lens that can provide more information such as multiple field of view, multispectral response, resolution, depth of focus, optical phase, etc. For example, depth information with respect to a field of view can be calculated according to images captured by two cameras at different locations. The depth information may be applied to generation of a three dimensional image or object recognition, etc. To make use of multiple cameras, the processor must be adept to interfacing, storing and processing data from multiple cameras. The processor architecture can consist of one processor with multiple and unique camera interfaces or use of external camera multiplexer component with multiple and unique camera input interface that can combine the data to a single output data port to a processor with one camera interface port, or using unique processors for each camera system. These solutions result in more hardware cost and require additional board space to support additional processor interface ports, additional components or additional processor. Therefore, it is an issue in the art about how this problem is addressed.

SUMMARY

Embodiments of the present invention provide a camera system including a processor, a first camera, a second camera, and a data bus. The processor has a data receiving terminal and a camera trigger terminal. The first camera has a trigger input terminal, a trigger output terminal, and a data output terminal, in which the trigger input terminal is electrically connected to the camera trigger terminal of the processor. The second camera has a trigger input terminal and a data output terminal, in which the trigger input terminal of the second camera is electrically connected to the trigger output terminal of the first camera. The data bus is electrically connected to the data receiving terminal of the processor, the data output terminal of the first camera, and the data output terminal of the second camera. The processor transmits a first trigger signal to the first camera through the camera trigger terminal to enable the first camera outputting first data to the processor through the data bus. The first camera transmits a second trigger signal to the second camera through the trigger output terminal of the first camera to enable the second camera outputting second data to the processor through the data bus.

In some embodiments, the first camera starts to sense a first image after receiving the first trigger signal, in which the first data includes the first image. The first camera transmits the second trigger signal to the second camera during a first period of the first camera outputting the first data to the processor through the data bus.

In some embodiments, the first camera enters a sleeping mode or a shutdown mode after outputting the first data to the processor.

In some embodiments, the data output terminal of the first/second camera is set to be in a high impedance state after the first/second camera outputs the first data to the processor. In this way, the first and second data can be transmitted to the processor through the shared data bus.

In some embodiments, the second camera starts to sense a second image after receiving the second trigger signal, in which the second data includes the second image. A period of the second camera sensing the second image at least partially overlaps with the first period of the first camera outputting the first data.

In some embodiments, the second camera enters a sleeping mode or a shutdown mode after outputting the second data to the processor.

In some embodiments, the first period of the first camera outputting the first data is directly followed by a second period of the second camera outputting the second data, and the first period does not overlap with the second period.

In some embodiments, the first camera starts to sense a first image after receiving the first trigger signal, in which the first data includes one or multiple rows of pixels of the first image. The first camera transmits the second trigger signal to the second camera during a period of the first camera sensing the first image.

In some embodiments, the second camera starts to sense a second image after receiving the second trigger signal, and the second data includes one or multiple rows of pixels of the second image. A period of the second camera sensing the second image at least partially overlaps with the period of the first camera sensing the first image. A first period of the first camera outputting the first data is directly followed by a second period of the second camera outputting the second data, and the first period does not overlap with the second period.

In some embodiments, the processor further includes a data sync terminal electrically connected to a sync terminal of the first camera and a sync terminal of the second camera; a data clock terminal electrically connected to a data clock terminal of the first camera and a data clock terminal of the second camera; a data control interface electrically connected to a control interface of the first camera and a control interface of the second camera; and a clock output terminal electrically connected to a clock input terminal of the first camera and a clock input terminal of the second camera. In some embodiments, the first camera is trigged by the signal from the data control interface of the processor.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology, but are not referred to particular order or sequence.

Figure 1:
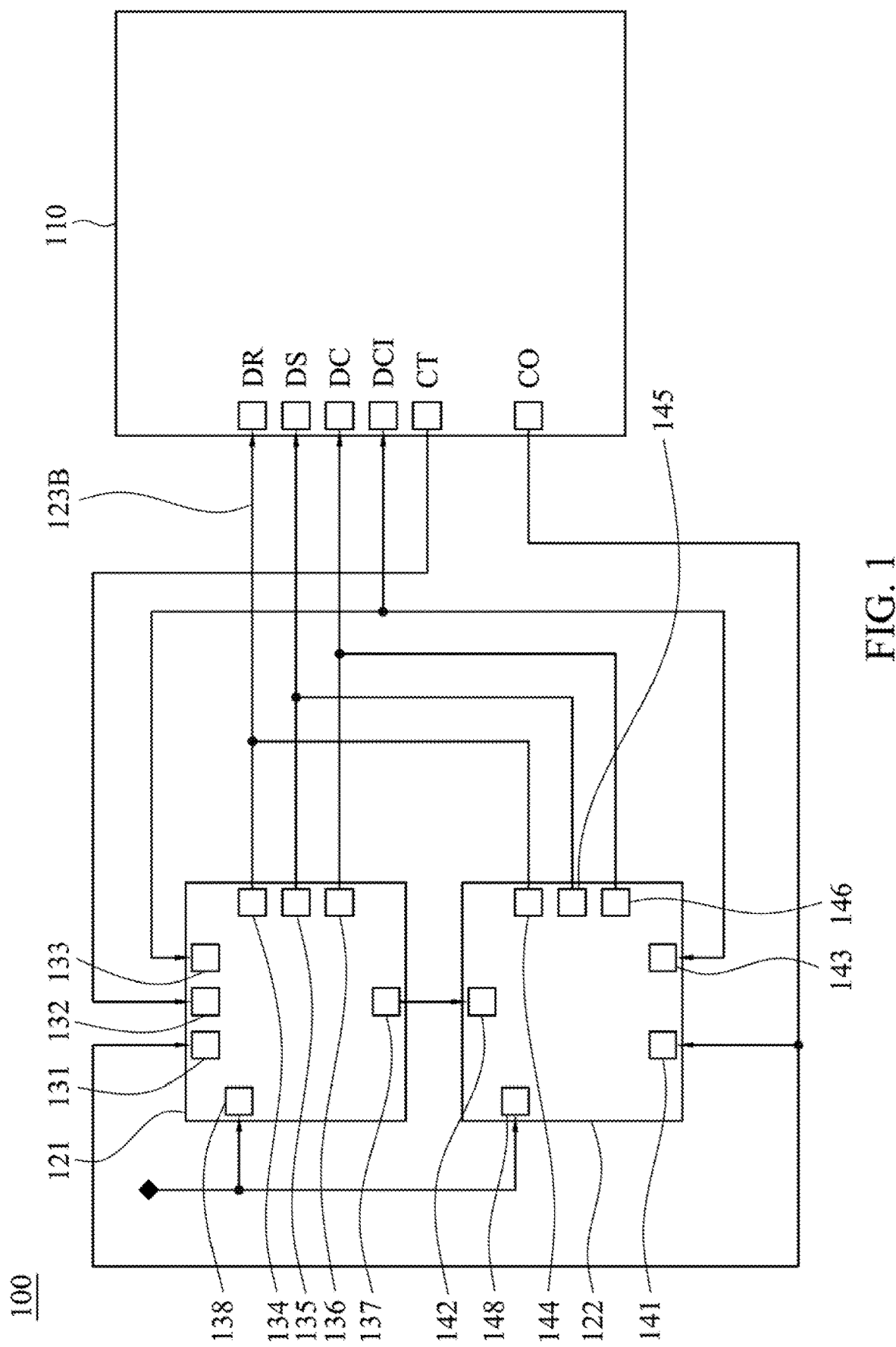
FIG. 1 is a schematic diagram illustrating a camera system in accordance with an embodiment.

FIG. 1 is a schematic diagram illustrating a camera system in accordance with an embodiment. Referring to FIG. 1, a camera system 100 includes a processor 110, a first camera 121, and a second camera 122. The processor 110 may be a microprocessor, a microcontroller, a digital signal processing circuit, an image processing chip, an application-specific integration circuit, etc. The first camera 121 and the second camera 122 may include a charge-coupled device (CCD), a complementary metal-oxide semiconductor (CMOS) sensor or any other suitable optical sensor for capturing images and/or videos. In some embodiments, the camera system 100 may be disposed in any electrical device such as smart phone, any forms of computer, monitor, etc., which is not limited in the invention.

The processor 110 has a data receiving terminal DR, a data sync terminal DS, a data clock terminal DC, a data control interface DCI, a camera trigger terminal CT, and a clock output terminal CO. The first camera 121 has a clock input terminal 131, a trigger input terminal 132, a control interface 133, a data output terminal 134, a sync terminal 135, a data clock terminal 136, a trigger output terminal 137, and a power terminal 138. The second camera 122 has a clock input terminal 141, a trigger input terminal 142, a control interface 143, a data output terminal 144, a sync terminal 145, a data clock terminal 146, and a power terminal 148. The data receiving terminal DR is electrically connected to the data output terminals 134, 144 through a data bus 123B. The data sync terminal DS is electrically connected to the sync terminals 135, 145. The data clock terminal DC is electrically connected to the data clock terminals 136, 146. The data control interface DCI is electrically connected to the control interfaces 133, 134. The camera trigger terminal CT is electrically connected to the trigger input terminal 132. The clock output terminal CO is electrically connected to the clock input terminals 131, 141. The trigger output terminal 137 is electrically connected to the trigger input terminal 142. The power terminals 138, 148 are electrically connected to a power source (not shown).

The data receiving terminal DR is configured to receive multimedia data (e.g. video, image, audio, or combination thereto) from the first camera 121 and the second camera 122. The data sync terminal DS is configured to transmit or receive a sync signal representing the start of transmitting the multimedia data in some embodiments. However, the sync signal may be used for synchronize another operation in other embodiments. The data clock terminal DC is configured to provide a clock for sampling the multimedia data. The data control interface DCI is configured to transmit or receive any control signal. For example, the data control interface DCI is how the processor 110 and the cameras 121 and 122 communicate for functions like sensor register initialization, sensor mode control, sensor timing control, etc. The clock output terminal CO is configured to provide another clock for the system operations of the first camera 121 and the second camera 122 or any other operation that is not limited in the invention.

In particular, the processor 110 would trigger the first camera 121 to initialize sensation, and the first camera 121 would trigger the second camera 122 to initialize another sensation without needing the processor 110 to trigger the second camera 122. In detail, referring to FIG. 1 and FIG. 2 which is a timing diagram of signals of the camera system in accordance with an embodiment. First, in a period 201, the processor 110 transmits a first trigger signal to the first camera 121 through the camera trigger terminal CT so that the first camera 121 starts an exposure procedure in a period 202 for sensing a first image. After the exposure procedure, the first camera 121 read pixel data of the first image in a period 203, and then after a small delay, the first camera 121 outputs data (including the first image) to the data receiving terminal DR of the processor 110 through the data bus 123B in a period 204. Note that the first camera 121 can read the pixel data and transmit the data to the processor 110 simultaneously, and therefore the period 203 and the period 204 may be overlapped with each other partially. Next, in a period 205, the first camera 121 transmits a trigger signal to a second camera 122 through the trigger output terminal 137. The second camera 122 receives the trigger signal in a period 206, and then starts another exposure procedure for sensing a second image in a period 207. After the exposure procedure is finished, the second camera 122 read the pixel data of the second image in a period 208, and after a small delay, the second camera 122 transmits data (including the second image) to the data receiving terminal DR of the processor 110 through the data bus 123B in a period 209.

Figure 2:
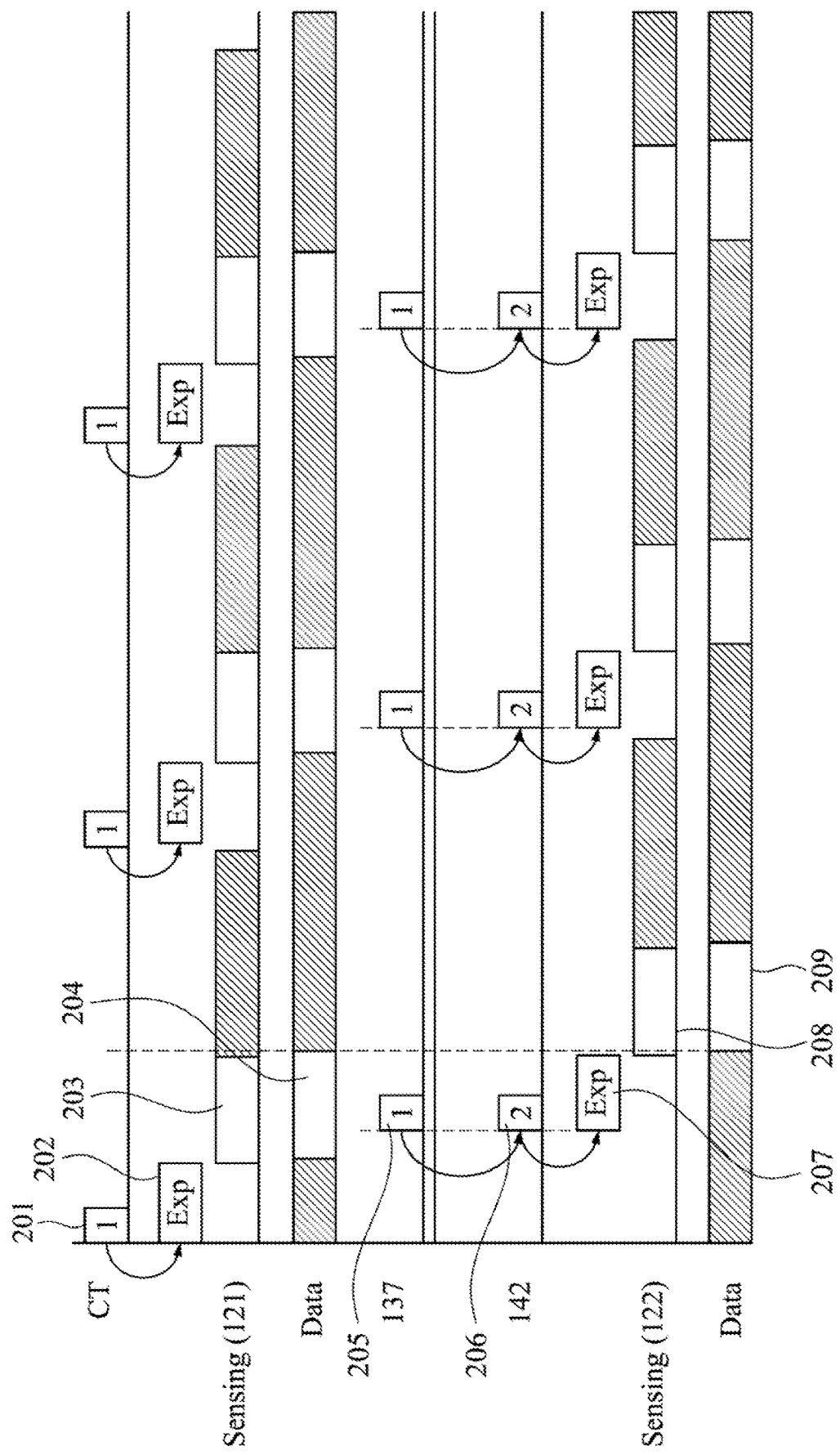
FIG. 2 is a timing diagram of signals of a camera system in accordance with an embodiment.

Note that when the first camera 121 transmits the data to the processor 110 in the period 204, the first camera 121 also transmits the trigger signal to the second camera 122. That is, the period 204 is at least partially overlapped with the period 205. As a result, when the first camera 121 transmits the data in the period 204, the second camera 122 can perform the exposure procedure in the period 207. In other words, the period 204 is at least partially overlapped with the period 207 for the purpose of parallelization. In some embodiments, the period 204 is directly followed by the period 209, and they are not overlapped with each other. In some embodiments, there is a gap between the period 209 and the period 204, which is not limited in the invention. Note that FIG. 2 is merely an example, and the periods of FIG. 2 may be shifted. For example, there may be a small gap between the period 201 and the period 202; and there may be a small gap between the period 207 and the period 206.

In some embodiments, the first camera 121 may enter a sleeping mode or a shutdown mode, which is represented by slash, after the period 203 for reducing power consumption. In addition, the first camera 121 may set the data output terminal 134 to be in a high impedance state, which is represented by slash, after the period 204. To be specific, three-state logic is applied to the data output terminal 134. When the data output terminal 134 is in the high impedance state, the data output terminal 144 of the second camera 122 can output the data to the processor 110. Accordingly, the first camera 121 and the second camera 122 can share the data bus 123B. Similarly, the second camera 122 can enter the sleeping mode or the shutdown mode after the period 208, and sets the data output terminal 144 to be in the high impedance state after the period 209.

In some embodiments, the trigger output terminal 137 is omitted, and the trigger input terminal 142 is electrically connected to another terminal (not shown) of the processor 110. In this case, the second camera 121 is triggered by the processor 110 instead of the first camera 121. Similarly, the processor 110 triggers the second camera 122 so that the period 204 for transmitting data is at least partially overlapped with the period 207 for the exposure procedure.

Figure 3:
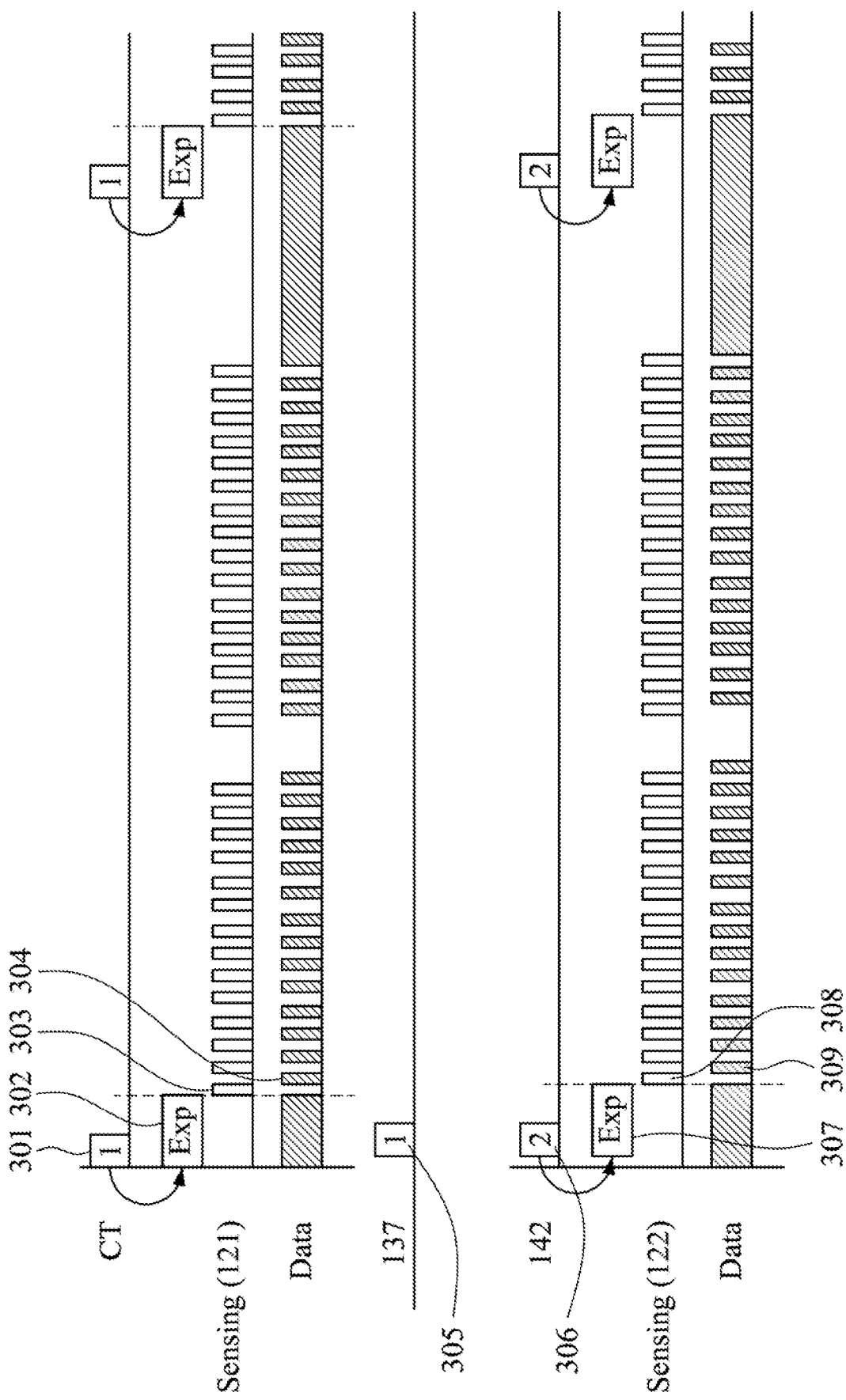
FIG. 3 is a timing diagram of signals of a camera system in accordance with an embodiment.

In the embodiment of FIG. 2, the second camera 122 starts transmitting the second image after the first camera 121 transmits the whole first image. However, the first camera 121 and the second camera 122 can alternatively transmit data in other embodiments. For example, FIG. 3 is a timing diagram of signals of the camera system in accordance with an embodiment. In a period 301, the processor 110 transmits a trigger signal to the first camera 121, and then the first camera 121 performs an exposure procedure for sensing a first image in a period 302. In a period 303, the first camera 121 reads one or multiple rows of pixel of the first image instead of the whole image, and transmits the read pixels to the processor 110. In a period 304, the data output terminal 134 of the first camera 121 is in the high impedance state. Note that the period of transmitting data is very close to the period of reading pixels (refer to the periods 208 and 209 in FIG. 2), and therefore only the period 304 is shown to indicate the high impedance state of the data output terminal 134 without showing the period of transmitting data in FIG. 3 for simplicity.

In a period 305, the first camera 121 transmits a trigger signal to the second camera 122, in which the period 305 is at least partially overlapped with the period 302. In a period 306, the second camera 122 receives the trigger signal, and hence performs the exposure procedure for sensing a second image in a period 307. The second camera 122 reads one or multiple rows of pixels of the second image in a period 308, and then transmits the read data to the processor 110. In a period 309, the data output terminal 144 of the second camera 122 is in the high impedance state. Similarly, only the period 309 is shown to indicate the high impedance state of the data output terminal 144 without showing the period of transmitting data for simplicity. In the embodiment, when the first camera 121 transmits the data, the data output terminal 144 of the second camera 122 is in the high impedance state, and on the contrary, data output terminal 134 of the first camera 121 is in the high impedance state when the second camera 122 transmits the data. The difference between FIG. 2 and FIG. 3 includes a feature that the period 302 is at least partially overlapped with the period 307 for reducing the exposure time difference between the two cameras.

In the aforementioned camera system, two cameras can share the same processor while the second camera is triggered by the first camera, and thus the complexity of the circuit is reduced.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A camera system, comprising:
   a processor having a data receiving terminal and a camera trigger terminal;
   a first camera having a trigger input terminal, a trigger output terminal, and a data output terminal, wherein the trigger input terminal is electrically connected to the camera trigger terminal of the processor;
   a second camera having a trigger input terminal and a data output terminal, wherein the trigger input terminal of the second camera is electrically connected to the trigger output terminal of the first camera; and
   a data bus electrically connected to the data receiving terminal of the processor, the data output terminal of the first camera, and the data output terminal of the second camera,
   wherein the processor transmits a first trigger signal to the first camera through the camera trigger terminal to enable the first camera outputting first data to the processor through the data bus,
   wherein the first camera transmits a second trigger signal to the second camera through the trigger output terminal of the first camera to enable the second camera outputting second data to the processor through the data bus,
   wherein the first camera starts to sense a first image after receiving the first trigger signal, and the first data comprises the first image,
   wherein the first camera transmits the second trigger signal to the second camera during a first period of the first camera outputting the first data to the processor through the data bus,
   wherein the data output terminal of the first camera is set to be in a high impedance state after the first camera outputs the first data to the processor.

2. The camera system of claim 1, wherein the first camera enters a sleeping mode or a shutdown mode after outputting the first data to the processor.

3. The camera system of claim 1, wherein the second camera starts to sense a second image after receiving the second trigger signal, wherein the second data comprises the second image,
   wherein a period of the second camera sensing the second image at least partially overlaps with the first period of the first camera outputting the first data.

4. The camera system of claim 3, wherein the second camera enters a sleeping mode or a shutdown mode after outputting the second data to the processor.

5. The camera system of claim 3, wherein the first period of the first camera outputting the first data is directly followed by a second period of the second camera outputting the second data, and the first period does not overlap with the second period.

6. The camera system of claim 1,
   wherein the first camera transmits the second trigger signal to the second camera during a period of the first camera sensing the first image.

7. The camera system of claim 6, wherein the second camera starts to sense a second image after receiving the second trigger signal, and the second data comprises one or a plurality of rows of pixels of the second image,
   wherein a period of the second camera sensing the second image at least partially overlaps with the period of the first camera sensing the first image,
   wherein a second period of the first camera outputting the first data is directly followed by a third period of the second camera outputting the second data, and the second period does not overlap with the third period.

8. The camera system of claim 1, wherein the processor further comprising:
   a data sync terminal electrically connected to a sync terminal of the first camera and a sync terminal of the second camera;

a data clock terminal electrically connected to a data clock terminal of the first camera and a data clock terminal of the second camera;

a data control interface electrically connected to a control interface of the first camera and a control interface of the second camera; and a clock output terminal electrically connected to a clock input terminal of the first camera and a clock input terminal of the second camera.

* * * * *